United States Patent [19]

Wachi et al.

[11] Patent Number: 5,168,484
[45] Date of Patent: Dec. 1, 1992

[54] MAGNETIC HEAD LIFTING DEVICE FOR MAGNETO-OPTICAL RECORDING/REPRODUCING APPARATUS INCLUDING DRIVE MEANS RESPONSIVE TO A PLL CIRCUIT

[75] Inventors: Shigeaki Wachi, Tokyo; Hideki Inoue, Kanagawa, both of Japan

[73] Assignee: Sony Corporation, Tokyo, Japan

[21] Appl. No.: 704,124

[22] Filed: May 22, 1991

[30] Foreign Application Priority Data

May 29, 1990 [JP] Japan .................................. 2-55367

[51] Int. Cl.[5] .................... G11B 13/04; G11B 11/10; G11B 11/12
[52] U.S. Cl. ...................................... 369/13; 360/59; 360/66; 360/114
[58] Field of Search ............................ 369/13, 14, 110; 360/59, 66, 60, 114, 103, 104

[56] References Cited

U.S. PATENT DOCUMENTS 5,095,475  3/1992  Oka et al. .................................. 360/66

FOREIGN PATENT DOCUMENTS 1-211259  8/1989  Japan ........................................ 369/13

OTHER PUBLICATIONS

English Translation of JP/01-211259.

Primary Examiner—Hoa Nguyen
Attorney, Agent, or Firm—Philip M. Shaw, Jr.

[57] ABSTRACT

A head protection control for a magneto-optical recording/reproducing device, including an elastic arm for mounting a magnetic head at one end portion of the arm and biasing the magnetic head in a direction contacting a surface of a magneto-optical disk, which elastic arm is movable in a radial direction of the magneto-optical disk; a driver for driving the elastic arm in a direction moving away from the surface of the magneto-optical disk; a phase-locked loop (PLL) for generating a lock signal when the PLL circuit becomes synchronous with a clock signal in a reproduced signal from the magneto-optical disk; and a controller for controlling the driver so as to cause the driver, upon receipt of the lock signal, to lower the magnetic head to face the magneto-optical disk during rotation at the predetermined speed with a fine gap defined between the magnetic head and the magneto-optical disk by a flying force due to an air stream. It is accordingly possible to prevent damage of the magnetic head or the disk surface even when the magnetic head sticks to the disk surface.

2 Claims, 2 Drawing Sheets

MAGNETIC HEAD LIFTING DEVICE FOR MAGNETO-OPTICAL RECORDING/REPRODUCING APPARATUS INCLUDING DRIVE MEANS RESPONSIVE TO A PLL CIRCUIT

BACKGROUND OF THE INVENTION

The present invention relates to a protection control for a head for recording or reproducing data in a magneto-optical recording/reproducing device.

As is well known in the art, a magneto-optical recording/reproducing device capable of recording or reproducing data in response to light is provided with a head structure such that a laser spot is irradiated through an objective lens onto a recording surface of a magneto-optical disk, and a magnetic head contacts the other surface of the magneto-optical disk on the opposite side of the recording surface, so as to apply a desired magnetic field at a position where the laser spot is irradiated.

Such a head structure is movable (thread feedable) in a radial direction of the magneto-optical disk, so as to trace a spiral recording track on the disk and write or read data at an arbitrary position of the recording track.

The head structure is normally constructed of an optical head for irradiating a laser beam onto a disk surface and a magnetic head for applying a magnetic field to the disk. The optical head and the magnetic head are moved together in the radial direction of the disk.

The optical head includes a focus servo for maintaining a constant distance between the objective lens and the disk surface. It is preferable that the magnetic head is disposed as close as possible with respect to the disk surface, but not to contact the disk surface, for the purpose of applying a large magnetic field.

As a method of maintaining a constant distance between the magnetic head and the disk surface spaced close to each other, it has been proposed that an actuator for the magnetic head and a control device for the actuator similar to the focus servo are provided. However, such a control means causes an increase in weight of the head as a whole and complicates the structure.

To cope with this problem, it is considered to adopt a magnetic head of a flying type as conventionally employed in a recording/reproducing head for a hard disk.

Referring to FIG. 2 which shows such a flying type magnetic head in an enlarged front elevation, an optical head 13 for irradiating a laser spot is located under a disk 11, and an objective lens L incorporated in the optical head 13 is controlled in position by a conventional focus servo technique. A magnetic head provided with a modulation coil 15 is located over the disk 11, and it is normally maintained in slight pressure contact with the disk 11 by an elastic arm 14 or the like for downwardly biasing the magnetic coil 15.

In such a head structure, when the disk 11 is rotated at a high speed in a direction of arrow Q by a motor (not shown), an air stream A is generated on the disk surface, and a flying force is generated by the air stream A to lift the modulation coil 15, thus defining a fine gap d (10 $\mu$m) between the disk 11 and a contact surface of the modulation coil 15.

Such a magnetic head is called a flying head. In the flying head, the fine gap d is maintained at a constant value when a rotating speed of the disk 11 is constant. Therefore, even when the modulation coil 15 is small, a magnetic field can be efficiently applied to the disk 11.

However, if the disk is not being rotated at a predetermined speed, the above-mentioned flying force cannot be constantly generated. That is, when the disk is in a stop condition, no flying force is generated. Further, if water or moisture exists on the disk surface, the magnetic head sticks to the disk surface under the stop condition of the disk. When the disk starts to be rotated under the above condition, there is a possibility of damage of the magnetic head or the disk surface.

SUMMARY OF THE INVENTION

It is accordingly an object of the present invention to provide a head protection control for a magneto-optical recording/reproducing device which can prevent damage of the magnetic head or the disk surface even when the magnetic head sticks to the disk surface.

According to the present invention, there is provided a magnetic head protection control device for a magneto-optical recording/reproducing apparatus which includes an optical head for recording information signals on, and reading information signals from a magneto-optical disk and a magnetic head for applying a magnetic field to the magneto-optical disk during the time that the optical head is recording information on the magneto-optical disk. The magnetic head protection control device according to the invention comprises an elastic arm for mounting the magnetic head at one end portion of the arm and biasing the magnetic head in a direction toward contacting a surface of the magneto-optical disk, the elastic arm also being movable radially with respect to the magneto-optical disk, a phase-locked loop circuit connected to the optical head to be supplied with the information signals reproduced by the optical head from the magneto-optical disk, the phase-locked loop circuit generating a lock signal when the phase-locked loop circuit becomes synchronous, i.e. locked with a clock signal in the reproduced information signal from the magneto-optical disk, and driving means connected to the phase-locked loop circuit for normally driving the elastic arm in a direction away from contact with the surface of the magneto-optical disk in the absence of receiving the lock signal. Thus, the elastic arm is driven by the driving means to normally lift the magnetic head away from the surface of the magneto-optical disk but lowers the magnetic head toward the surface of the magneto-optical disk upon generation of the lock signal.

When the rotating speed of the magneto-optical disk reaches a predetermined speed, a clock signal in an RF signal from the magneto-optical disk is detected, and the phase-locked loop circuit is locked. The lock signal is supplied from the phase-locked loop circuit to the driving means. Accordingly, the driving means is de-energized to thereby cancel the driving force applied to the elastic arm. As a result, the magnetic head is lowered to face the magneto-optical disk during rotation at the predetermined speed with a fine gap defined between the magnetic head and the magneto-optical disk by a flying force due to an air stream.

Other objects and features of the invention will be more fully understood from the following detailed description and appended claims when taken with the accompanying drawings.

DETAILED DESCRIPTION OF THE PREFERRED EMBODIMENT

Figure 1:
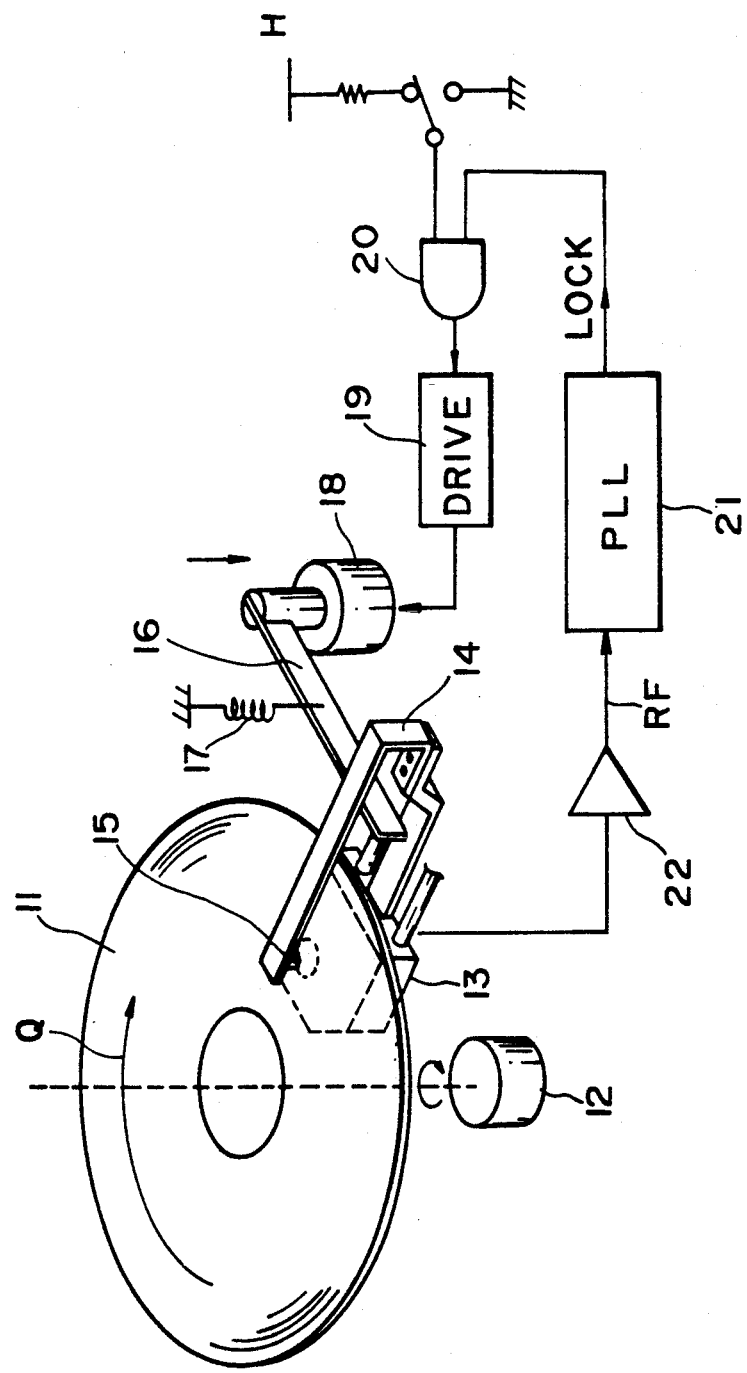
FIG. 1 is a schematic illustration of the head protection control according to a preferred embodiment of the present invention.
Figure 2:
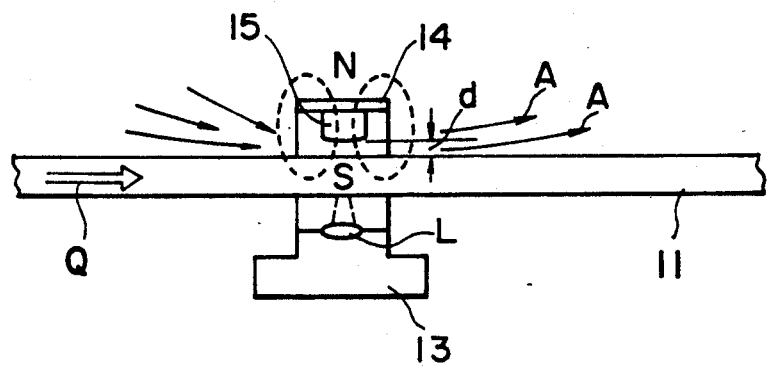
FIG. 2 is an enlarged front elevation of a flying head in the prior art, explaining the operation of the flying head.

Referring to FIG. 1, the same reference numerals appear as were used in FIG. 2 and a preferred embodiment of the head protection control for the magneto-optical recording/reproducing device according to the present invention is shown. Reference numeral 11 designates a magneto-optical disk (which will be hereinafter abbreviated to MO disk). The MO disk 11 is rotated by a spindle motor 12. An optical head 13 is located under the MO disk 11 for reading data from the MO disk 11 or writing data to the MO disk 11. As is well known in the art, the optical head 13 incorporates a light emitting source, light receiving member, optical lens, etc. Although not shown, a thread feed device is provided to move the MO disk 11 in a radial direction thereof relative to the head 13 and the magnetic coil 15 in irradiating a laser spot onto a recording surface (lower surface) of the MO disk 11.

Reference numeral 14 designates an elastic arm integrally assembled with the optical head 13. A modulation coil 15 for applying a magnetic field to the MO disk 11 is mounted on a lower surface of the elastic arm 14 at a front end portion thereof. The elastic arm 14 is normally given a biasing force for making a slight pressure contact of the modulation coil 15 with an upper surface of the MO disk 11.

Reference numeral 16 designates a lift plate having a free end portion for lifting the elastic arm 14. The lift plate 16 is connected at a base end thereof to an electromagnetic plunger 18. A tension spring 17 is connected at one end thereof to an intermediate portion of the lift plate 16.

Reference numeral 19 designates a drive circuit for driving the electromagnetic plunger 18. The drive circuit 19 is supplied with a lock signal from a PLL circuit 21 and a power on/off signal (or a recording/reproducing control signal) through an AND gate 20.

Reference numeral 22 designates a reproducing amplifier for reproducing a clock signal from an RF signal output from the optical head 13.

Now, the operation of the preferred embodiment mentioned above will be described.

When the MO disk 11 is loaded into the magneto-optical recording/reproducing device, and power is turned on, a signal is output from the drive circuit 19 to drive the electromagnetic plunger 18.

Accordingly, the lift plate 16 is lifted to forcibly upwardly urge the elastic arm 14, thereby slightly separating the modulation coil 15 from the upper surface of the MO disk 11.

Next, the spindle motor 12 is rotated to rotationally drive the MO disk 11, so as to carry out recording or reproducing data. At this same time, a focus servo (not shown) is started to obtain a tracking condition.

Then, a track position of recorded data is specified, and the optical head 13 is moved in the radial direction of the MO disk 11. At this time, the RF signal reproduced by the optical head 13 is supplied to the PLL circuit 21, and the PLL circuit 21 is locked by a clock signal in the RF signal.

When the lock (L level) indicative of the fact that the PLL circuit 21 has been locked is supplied to the AND gate 20, the electromagnetic plunger 18 is de-energized by the drive circuit 19. As a result, the lift plate 16 is lowered to obtain a recording mode. Since the MO disk 11 is rotated at a predetermined speed at this time, a flying force due to the air stream as previously mentioned is applied to the modulation coil 15. Therefore, even when the lift plate 16 is lowered, the modulation coil 15 is stopped by this flying force at a position slightly spaced from the upper surface of the MO disk 11.

Under this condition, data is supplied from a recording circuit (not shown) to the optical head 13 and the modulation coil 15, thereby carrying out recording the data onto the MO disk 11.

Further, when the PLL circuit 21 is not locked regardless of the fact that the focus servo has been started and the MO disk 11 is being rotated at the predetermined speed, the disk cartridge may be ejected to stop writing.

It is to be noted that the driving means for lifting the elastic arm 14 is not limited to the above preferred embodiment. For example, a combination of a cam member and a motor, or a crank mechanism adapted to be operated by an electromagnetic relay may be adapted as the driving means according to the present invention.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A magnetic head protection control device for a magneto-optical recording and reproducing apparatus which includes an optical head for recording information signals on, and reading information signals from a magneto-optical disk and a magnetic head for applying a magnetic field to the magneto-optical disk during the time that the optical head is recording information on the magneto-optical disk, wherein the magnetic head protection control device comprises:

an elastic arm for mounting the magnetic head at one end portion of the arm and biasing the magnetic head in a direction toward contacting a surface of the magneto-optical disk, and the elastic arm also being movable radially with respect to the magneto-optical disk;

a phase-locked loop circuit connected to the optical head to be supplied with the information signals reproduced by the optical head from the magneto-optical disk, the phase-locked loop circuit generating a lock signal only when the phase-locked loop circuit becomes synchronous with a clock signal in the reproduced information signals from the magneto-optical disk; and driving means connected to the phase-locked loop circuit for driving the elastic arm to lift the magnetic head away from the surface of the magneto-optical disk in the absence of the lock signal generated from the phase-locked loop circuit and to lower the magnetic head toward the surface of the magneto-optical disk upon generation of the lock signal from the phase-locked loop circuit.

2. The magnetic head protection control device as defined in claim 1, wherein the driving means comprises a lift plate for lifting the elastic arm, an electromagnetic plunger for driving the lift plate, and an energizing circuit for energizing the electromagnetic plunger, wherein when the lock signal is supplied from the phase-locked loop circuit to the energizing circuit, the energizing circuit de-energizes the electromagnetic plunger and thereby cancels the driving force.

* * * * *